US011824359B2

(12) United States Patent
Ku et al.

(10) Patent No.: US 11,824,359 B2
(45) Date of Patent: Nov. 21, 2023

(54) ELECTRICITY MANAGEMENT APPARATUS FOR TRADING DUMP POWER FOR HOUSING, AND HOUSING COMPLEX ASSOCIATION METHOD

(71) Applicant: ELECTRONICS AND TELECOMMUNICATIONS RESEARCH INSTITUTE, Daejeon (KR)

(72) Inventors: Tai-Yeon Ku, Daejeon (KR); Wan Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 335 days.

(21) Appl. No.: 17/158,356

(22) Filed: Jan. 26, 2021

(65) Prior Publication Data
US 2021/0257836 A1 Aug. 19, 2021

(30) Foreign Application Priority Data

Jan. 28, 2020 (KR) .................. 10-2020-0009794
Jan. 26, 2021 (KR) .................. 10-2021-0010740

(51) Int. Cl.
*H02J 3/00* (2006.01)
*H02J 3/14* (2006.01)
(Continued)

(52) U.S. Cl.
CPC .............. *H02J 3/008* (2013.01); *G05B 15/02* (2013.01); *H02J 3/003* (2020.01); *H02J 3/144* (2020.01);
(Continued)

(58) Field of Classification Search
CPC .... H02J 3/008; H02J 3/003; H02J 3/14; H02J 3/144; H02J 3/381; H02J 2300/24;
(Continued)

(56) References Cited

U.S. PATENT DOCUMENTS 9,733,623 B2 * 8/2017 Yang ................. H02J 3/00
9,825,479 B2 * 11/2017 Kim .................. H02J 3/381
(Continued)

FOREIGN PATENT DOCUMENTS

JP 2003-032887 A 1/2003
JP 2011-083086 A 4/2011
(Continued)

OTHER PUBLICATIONS

Jinsoo Han et al., "Analysis of Economic Benefits of Broker-Based Energy Trading in a Residential Energy Community", KICS Conference 2019.

*Primary Examiner* — M. N. Von Buhr
(74) *Attorney, Agent, or Firm* — LRK PATENT LAW FIRM (57) ABSTRACT

A power management apparatus and a housing complex combination method for trading surplus power for a housing are provided. Influencing factors in analyzing a consumption pattern of an individual housing and various correlations between the influencing factors are analyzed, and an optimal sustainable housing complex through supply of new renewable energy is formed.

12 Claims, 6 Drawing Sheets

(51) Int. Cl.
*G05B 15/02* (2006.01)
*H02J 3/38* (2006.01)

(52) U.S. Cl.
CPC ............ *H02J 3/381* (2013.01); *H02J 2300/24* (2020.01); *H02J 2310/12* (2020.01)

(58) Field of Classification Search
CPC ............... H02J 2310/12; H02J 2203/10; H02J 2203/20; H02J 1/14; G05B 15/02; Y02E 10/56; Y02E 60/00; Y04S 40/20; Y04S 50/10; G06Q 30/0205; G06F 16/285; G06F 16/29; G06F 18/23
See application file for complete search history.

(56) References Cited

U.S. PATENT DOCUMENTS

| | | | | |
|---|---|---|---|---|
| 10,044,192 | B2 * | 8/2018 | Singh | H02J 13/00034 |
| 10,720,794 | B2 * | 7/2020 | Bhageria | G05B 15/02 |
| 10,816,235 | B2 * | 10/2020 | Turney | G06Q 10/06 |
| 10,879,695 | B2 * | 12/2020 | Matan | H02J 3/38 |
| 11,223,206 | B2 * | 1/2022 | Ilic | H02J 3/003 |
| 11,462,908 | B2 * | 10/2022 | Matan | H02J 13/00 |
| 11,522,487 | B2 * | 12/2022 | Dong | H02S 10/20 |
| 2014/0214222 | A1 * | 7/2014 | Rouse | G06Q 10/06 700/291 |
| 2015/0105928 | A1 * | 4/2015 | Lazaris | H02J 3/004 700/295 |
| 2016/0231764 | A1 | 8/2016 | Kim et al. | |
| 2016/0254666 | A1 * | 9/2016 | Curtiss | H02J 3/0073 700/292 |
| 2016/0322823 | A1 | 11/2016 | Park et al. | |
| 2017/0330294 | A1 * | 11/2017 | Murakami | H02J 3/003 |

FOREIGN PATENT DOCUMENTS

| | | |
|---|---|---|
| JP | 2013-240154 A | 11/2013 |
| KR | 10-2009-0032486 A | 4/2009 |
| KR | 10-1396094 B1 | 5/2014 |
| KR | 101739271 B1 | 5/2017 |
| KR | 10-1796669 B1 | 11/2017 |
| KR | 10-2018-0101147 A | 9/2018 |
| KR | 10-2018-0103327 A | 9/2018 |
| KR | 10-1965301 B1 | 4/2019 |
| WO | 2012105105 A1 | 8/2012 |

* cited by examiner

ELECTRICITY MANAGEMENT APPARATUS FOR TRADING DUMP POWER FOR HOUSING, AND HOUSING COMPLEX ASSOCIATION METHOD

CROSS-REFERENCE TO RELATED APPLICATIONS

This application claims the benefit of Korean Patent Application No. 10-2020-0009794 filed on Jan. 28, 2020, and Korean Patent Application No. 10-2021-0010740 filed on Jan. 26, 2021, in the Korean Intellectual Property Office, the entire disclosures of which are incorporated herein by reference for all purposes.

BACKGROUND

1. Field of the Invention

The present disclosure relates to a power management apparatus and a housing complex combination method for trading surplus power for a housing and more particularly, to an apparatus and method for analyzing a power generation amount and a power consumption amount for each of housings that constitute a housing complex and calculating and managing the optimal facility capacity to be maintained.

2. Description of Related Art

Surplus power refers to electricity that remains after consumption and surplus power trading refers to sale of power that remains after consumption. Energy trading based on power brokerage trading refers to sale of electricity generated at the present time to a consumer that needs the electricity the most based on the present time, instead of selling the remaining electricity. Therefore, energy trading with a consumer is not performed based on a total amount of energy, that is, accumulated energy, and trading of energy generated every moment needs to be immediately connected with a consumer upon request. By applying a characteristic of energy that, if the energy is not consumed at the same time as the energy is generated, the energy needs to be stored at enormous cost, otherwise, disappears, the generated electricity may be delivered to a consumer in a timely manner.

In recent years, new renewable energy is actively being introduced to reduce national greenhouse gases due to rise in a temperature caused by global warming. In particular, there is an aim to reduce a large amount of carbon dioxide by improving facility efficiency and expanding supply of new renewable energy for buildings, such as, for example, residential and commercial buildings.

Therefore, solar power for urban vehicles has been widely distributed around the word and small-scale power brokerage projects are actively being promoted to increase household revenue. However, irrespective of the purpose of promotion, new renewable energy facilities are being installed and expanded indiscriminately and inappropriately to supply new renewable energy.

Also, in the power brokerage business, supply-oriented power is being supplied as in the past and new renewable energy facilities need to be installed for each building, which may require large initial capital and high economic burden. Also, individual management is limited due to individually installed new renewable energy facilities.

Accordingly, there is a need for technology that may more efficiently operate new renewable energy and achieve energy independence through integrated management rather than individual management.

SUMMARY

The present disclosure provides an apparatus and method that may generate housing complex combination for trading surplus power for housing and may maintain and operate the generated housing complex combination.

The present disclosure also provides an apparatus and method that may build a sustainable new renewable energy-based housing complex through supply of new renewable energy by analyzing a correlation between influencing factors that affect a housing surplus index and by combining housing complexes.

The present disclosure also provides an apparatus and method that may further accurately verify net profit of surplus power by calculating and upgrading results that include external trading revenue as well as surplus power trading in a housing complex.

A housing complex combination method according to an example embodiment may include determining a consumption pattern according to a power consumption amount for each individual housing based on a power unit for energy independence; extracting individual housings having different consumption patterns based on a similarity between consumption patterns determined for the respective individual housings; setting a plurality of housing complexes by grouping the individual housings; and determining energy capacity of each of the set housing complexes and setting consumption patterns of the housing complexes based on the determined energy capacity.

The determining of the consumption pattern may include determining a power surplus amount based on the power consumption amount for each individual housing; and determining a consumption pattern of each of the individual housings based on a surplus index of the determined power surplus amount.

The determining of the power surplus amount may include determining the power surplus amount based on a power generation amount for each influencing factor that includes at least one of a time factor, a day factor, a weekday factor, a weather factor, an event factor, a season factor, and a person factor that are related to power generation of the individual housing.

The surplus index of the power surplus amount may represent a negative value or a positive value for the power surplus amount based on the power generation amount for each influencing factor and the power consumption amount of the individual housing.

The extracting of the individual housings may include extracting individual housings having different consumption patterns based on a consumption pattern for each individual housing and a type of energy facility installed for each individual housing.

The extracting of the individual housings may include extracting individual housings having different consumption patterns based on a difference value between surplus indices of power surplus amounts according to consumption patterns for the respective individual housings.

The setting of the consumption patterns may include setting consumption patterns of housing complexes for inducing energy independence based on sharing or non-sharing of resources and presence or absence of power trading between individual housings that constitute each of the set housing complexes.

The housing complex combination method may include analyzing power sales revenue for each housing complex according to a consumption pattern of each of the housing complexes and regrouping individual housings that constitute the housing complexes.

A housing complex combination method according to another example embodiment may include determining a power surplus amount according to a power consumption amount for each individual housing based on a power unit for energy independence; determining a consumption pattern of each of individual housings based on a surplus index of the determined power surplus amount and extracting individual housings having different consumption patterns; grouping the individual housings having the different consumption patterns into housing complexes; and determining energy capacity of each of the grouped housing complexes and setting consumption patterns of the housing complexes based on the determined energy capacity.

The extracting of the individual housings may include determining the consumption pattern of the individual housing using a surplus index of the power surplus amount that represents a negative value or a positive value for the power surplus amount based on a power generation amount for each influencing factor related to power generation of the individual housing and a power consumption amount of the individual housing.

The extracting of the individual housings may include extracting individual housings having different consumption patterns based on a consumption pattern for each individual housing and a type of energy facility installed for each individual housing.

The setting of the consumption patterns may include setting consumption patterns of housing complexes for inducing energy independence based on sharing or non-sharing of resources and presence or absence of power trading between individual housings that constitute each of the set housing complexes.

A power management apparatus according to another example embodiment may include a processor. The processor may be configured to determine a consumption pattern according to a power consumption amount for each individual housing based on a power unit for energy independence, extract individual housings having different consumption patterns based on a similarity between consumption patterns determined for the respective individual housings, set a plurality of housing complexes by grouping the individual housings, and determine energy capacity of each of the set housing complexes and set consumption patterns of the housing complexes based on the determined energy capacity.

The processor may be configured to determine a power surplus amount based on the power consumption amount for each individual housing, and determine a consumption pattern of each of the individual housings based on a surplus index of the determined power surplus amount.

The processor may be configured to extract individual housings having different consumption patterns based on a consumption pattern for each individual housing and a type of energy facility installed for each individual housing.

The processor may be configured to set consumption patterns of housing complexes for inducing energy independence based on sharing or non-sharing of resources and presence or absence of power trading between individual housings that constitute each of the set housing complexes.

A power management apparatus according to another example embodiment may include a processor. The processor may be configured to determine a power surplus amount according to a power consumption amount for each individual housing based on a power unit for energy independence, determine a consumption pattern of each of individual housings based on a surplus index of the determined power surplus amount and extract individual housings having different consumption patterns, group the individual housings having the different consumption patterns into housing complexes, and determine energy capacity of each of the grouped housing complexes and set consumption patterns of the housing complexes based on the determined energy capacity.

The processor may be configured to determine the consumption pattern of the individual housing using a surplus index of the power surplus amount that represents a negative value or a positive value for the power surplus amount based on a power generation amount for each influencing factor related to power generation of the individual housing and a power consumption amount of the individual housing.

The processor may be configured to extract individual housings having different consumption patterns based on a consumption pattern for each individual housing and a type of energy facility installed for each individual housing.

The processor may be configured to set consumption patterns of housing complexes for inducing energy independence based on sharing or non-sharing of resources and presence or absence of power trading between individual housings that constitute each of the set housing complexes.

Advantageous Effects

According to an example embodiment, a housing complex combination method may generate housing complex combination for trading surplus power for housing and may maintain and operate the generated housing complex combination.

According to an example embodiment, a housing complex combination method may build a sustainable new renewable energy-based housing complex through supply of new renewable energy by analyzing a correlation between influencing factors that affect a housing surplus index and by combining housing complexes.

According to an example embodiment, a housing complex combination method may further accurately verify net profit of surplus power by calculating and upgrading results that include external trading revenue as well as surplus power trading in a housing complex.

DETAILED DESCRIPTION OF THE INVENTION

Hereinafter, example embodiments are described with reference to the accompanying drawings.

Figure 1:
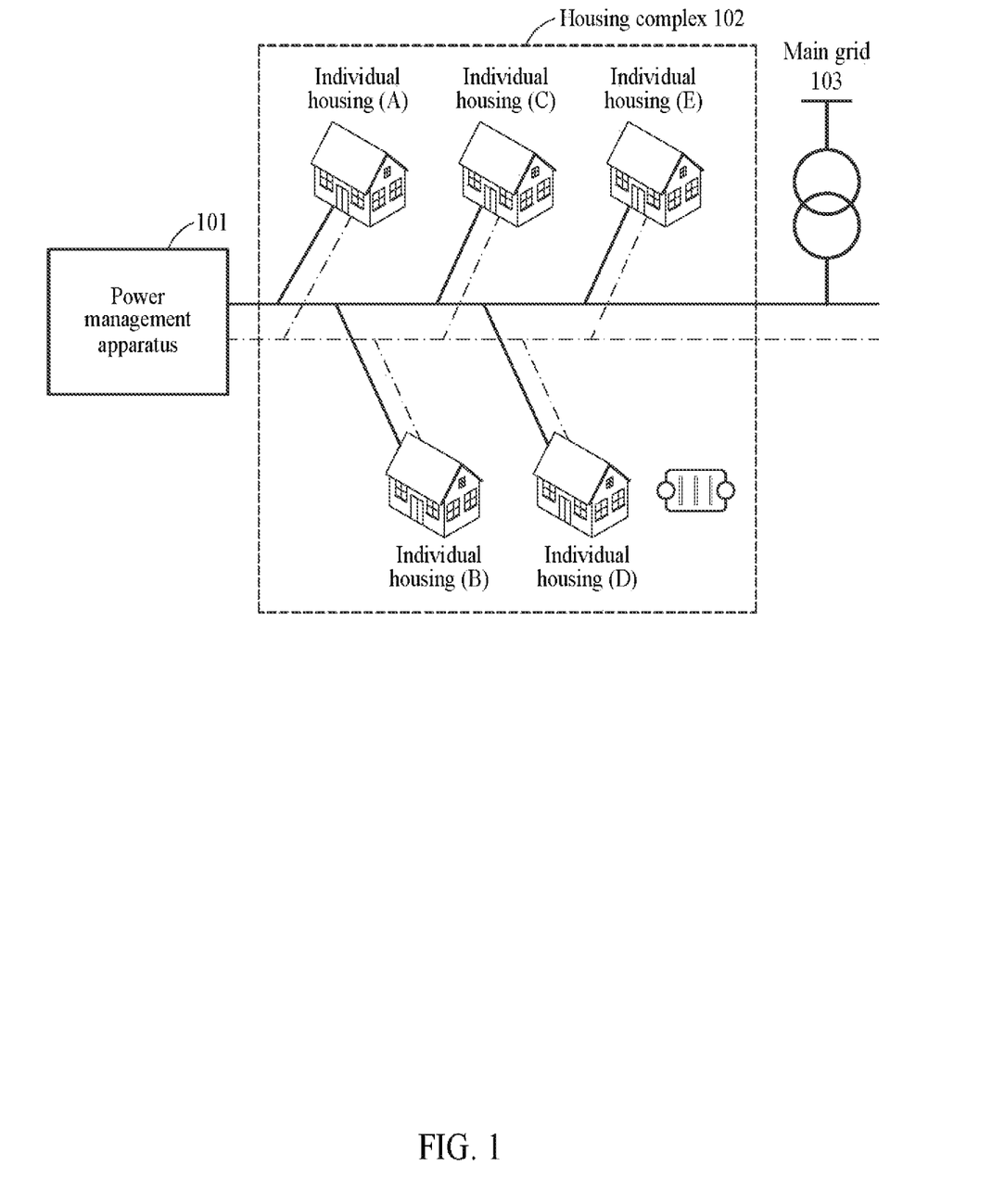
FIG. 1 illustrates an example of describing an overall operation for building a housing complex for trading surplus power for housing according to an example embodiment.

FIG. 1 illustrates an example of describing an overall operation for building a housing complex for trading surplus power for housing according to an example embodiment.

Referring to FIG. 1, a power management apparatus 101 may group a plurality of individual housings that are adjacent to each other into a housing complex and may integrate and manage individual housings for each housing complex. Also, the power management apparatus 101 may group the plurality of individual housings into a housing complex for energy independence of an individual housing and may perform an optimal energy operation according to a power use for each of individual housings that constitute the housing complex. Here, the energy independence may refer to a type of generating and consuming electricity through self-sufficiency without acquiring energy for power use from a main grid 103.

To this end, the power management apparatus 101 may determine a consumption pattern according to a power consumption amount for each individual housing based on a power unit for energy independence. Here, the power unit refers to a power use criterion for energy independence and may be defined as a unit of energy independence based on various criteria, such as, for example, an annual basis, a monthly basis, a weekly basis, and a daily basis. For example, energy independence defined in Korea is defined as a case in which a generation amount per one hour is greater than a consumption amount. The present disclosure may combine and thereby integrate and manage housing complexes 102 to aim at energy independence in a unit of one hour according to a power condition.

Here, the present disclosure may perform a method of combining the housing complexes 102 that may provide the maximum effect at minimal cost using energy facilities pre-installed in individual housings to expand the supply of new renewable energy. That is, the maximum effect may need to be acquired at minimum cost to expand the supply of new renewable energy and the efficient use and management of idle new renewable energy equipment may be required to acquire the maximum effect.

Accordingly, for energy independence based on a unit of individual housing, power may need to be generated according to a total consumption amount and electricity that remains without being immediately used may need to be stored and used when necessary. Also, for energy independence based on a unit of individual housing, an occurrence of rapid electricity consumption may need to be handled by generating an amount of electricity greater than an average electricity consumption amount To this end, the power management apparatus 101 may group, into the housing complex 102, a plurality of individual housings having different power consumption patterns for the respective individual housings as an interest community rather than having equipment in an individual housing and may perform energy management and settlement for the same based on an energy group unit. The housing complex 102 proposed herein may be defined as the housing complex 102 that is designed and operates to generate an amount of energy greater than an amount of energy consumed based on all energy used and generated in buildings and land in the housing complex 102 through the new renewable energy and thereby supply surplus energy to neighboring buildings through a grid and to participate in a power brokerage market.

The power management apparatus 101 may determine a power surplus amount according to the power consumption amount for each individual housing based on a power unit. The power management apparatus 101 may determine a consumption pattern of each of the individual housings based on a surplus index of the determined power surplus amount. The power management apparatus 101 may extract individual housings having different consumption patterns based on a similarity between consumption patterns determined for the respective individual housings. The power management apparatus 101 may set the plurality of housing complexes 102 by grouping the individual housings. The power management apparatus 101 may reduce self-power generation cost and improve shared resource utilization by sharing power resources between housing complexes into which individual housings are grouped.

Herein, a degree of matching with different individual housings that constitute the housing complex 102 may be analyzed based on a surplus index derived for each housing. The power management apparatus 101 may generate a housing complex having a largest difference in a consumption pattern based on the surplus index derived by an influencing factor. As the difference in the consumption pattern increases, a difference in a value of the surplus index may increase.

The power management apparatus 101 may determine energy capacity of each of the set housing complexes 102 and may set consumption patterns of the housing complexes 102 based on the determined energy capacity. The power management apparatus 101 may analyze power sales revenue for each housing complex 102 according to a consumption pattern of each of the housing complexes 102 and may regroup individual housings that constitute the housing complexes 102.

The power management apparatus 101 may reduce power transmission cost by minimizing investment cost used for long-distance power transmission. Also, a demand for connection capacity expansion is on the increase according to an increase in solar power generation in a distribution network. Therefore, the power management apparatus 101 may reduce investment cost of additional facility through a reduction of fluctuation in new renewable energy by applying the method proposed herein. Further, the power management apparatus 101 may enable the stability of the distribution network by increasing plus energy (surplus power) based on a time unit.

Figure 2:
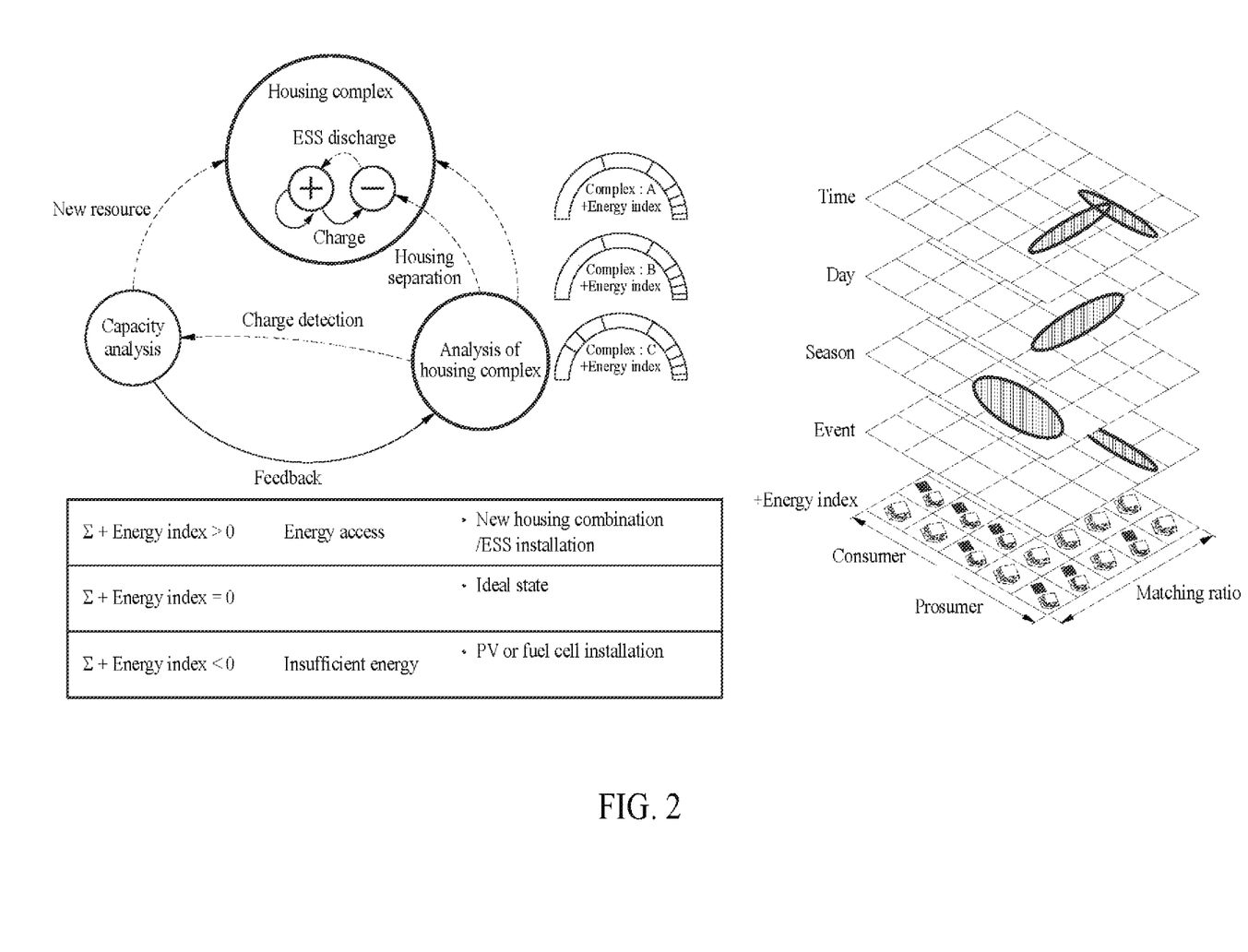
FIG. 2 illustrates an example of describing an operation of using a clustering method to build a housing complex according to an example embodiment.

FIG. 2 illustrates an example of describing an operation of using a clustering method to build a housing complex according to an example embodiment.

Referring to FIG. 2, the power management apparatus 101 may analyze a consumption pattern of each of individual housings and may combine a plurality of different individual housings into a housing complex. The power management apparatus 101 may use a housing energy clustering method. The housing energy clustering method may efficiently use limited resources in an energy housing complex. To acquire the maximum effect with the same resources, the power management apparatus 101 may correctly group housings having different consumption patterns and may perform autonomous resource sharing and allocation according to a difference between the consumption patterns.

The power management apparatus 101 may group, into a housing complex, individual housings having different consumption patterns according to the housing energy clustering method and may calculate and integrally manage renewable energy capacity for each housing complex, thereby inducing ease of management and efficient use of equipment.

In detail, the power management apparatus 101 may determine a power surplus amount based on the power consumption amount for each individual housing by considering a power unit for energy independence. The power management apparatus 101 may determine a consumption pattern of each individual housing based on a surplus index of the determined power surplus amount. The surplus index of the power surplus amount may represent a negative value or a positive value for the power surplus amount based on a power generation amount for each influencing factor and a power consumption amount of the individual housing. That is, the surplus index of the power surplus amount may be defined as an index of the power surplus by analyzing an influencing factor of the individual housing and the housing complex. The surplus index may relate to measuring suitability of clustering between the individual housing and the housing complex.

For the optimal efficiency of renewable energy installations, the surplus index may represent, desirably, a value of +0. To this end, according to the example embodiment, if the surplus index is positive, the present disclosure may group, into a housing complex, individual housings having a large consumption amount at the time of ESS (Energy Storage System) expansion and surplus. Also, according to the example embodiment, if the surplus index is negative, the present disclosure may determine that generation is insufficient and may induce a generation amount through PV (photovoltaic) and fuel cell expansion.

Therefore, the power management apparatus 101 may determine the consumption pattern of each individual housing according to the surplus index. The power management apparatus 101 may determine the consumption pattern by considering multidimensional influencing factors. The multidimensional influencing factors are further described with reference to FIG. 4.

The power management apparatus 101 may group individual housings having different consumption patterns into a housing complex based on a similarity between consumption patterns determined for the respective individual housings. The power management apparatus 101 may determine energy capacity of each of the set housing complexes and may set consumption patterns of the housing complexes based on the determined energy capacity. Here, the energy capacity refers to expansion capacity of renewable energy in the set housing complex and may be calculated based on surplus of the housing complex.

Figure 3:
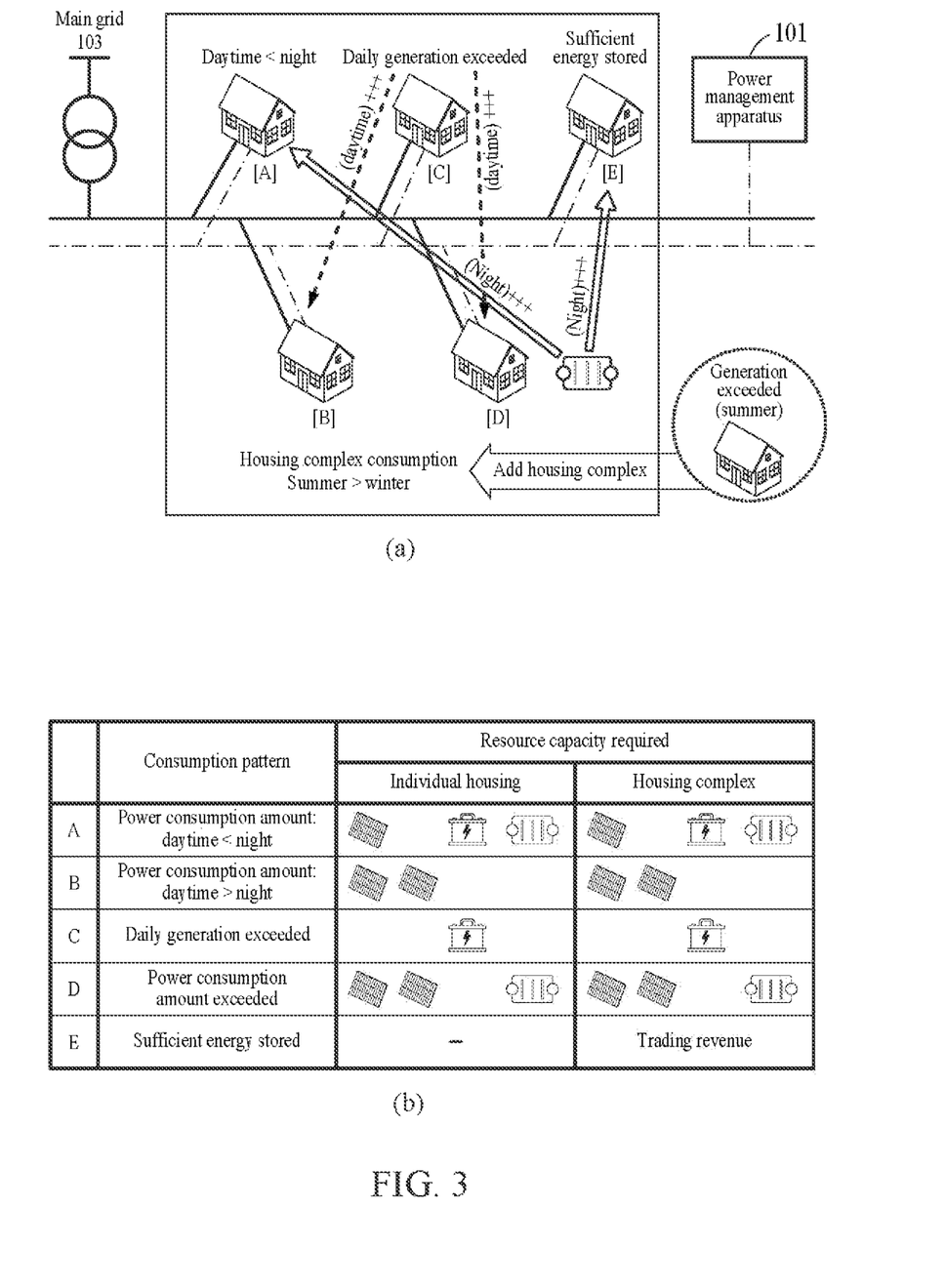
FIG. 3 illustrates an example of describing an operation of using a method of sharing and distributing resources in a housing complex according to an example embodiment.

FIG. 3 illustrates an example of describing an operation of using a method of sharing and distributing resources in a housing complex according to an example embodiment.

Referring to FIG. 3, the power management apparatus 101 may share and distribute resources in a housing complex to achieve energy independence for each of individual housings that constitute the housing complex. Here, each of the individual housings that constitute the housing complex may represent a different consumption pattern according to a lifestyle of a resident. The present disclosure describes an operation of sharing and distributing resources according to a consumption pattern based on the consumption pattern of each individual housing.

The consumption pattern may be largely classified into five types: ① power consumption amount: daytime<night (hereinafter, consumption pattern 1), ② power consumption amount: daytime>night (hereinafter, consumption pattern 2), ③ daily generation exceeded (hereinafter, consumption pattern 3), ④ power consumption amount exceeded (hereinafter, consumption pattern 4), and ⑤ sufficient energy stored (hereinafter, consumption pattern 5).

(a) Individual Housing

An individual housing A may be operated in a form of the consumption pattern 1. The individual housing A according to the consumption pattern 1 may consume larger power at night and, thus may install large capacity PV to generate electricity during the daytime and may require ESS for storing the generated electricity for use at night. Also, the individual housing A may need to additionally install a fuel cell into consideration of a situation in which energy is insufficient.

An individual housing B may be operated in a form of the consumption pattern 2. The individual housing B according to the consumption pattern 2 may consume larger power during the daytime and may require installation of PV.

An individual housing C may be operated in a form of the consumption pattern 3. The individual housing C according to the consumption pattern 3 may require large capacity ESS to store sufficient power since a generation amount is greater than a consumption amount. There is a need to make a profit through sale of accumulated power.

An individual housing D may be operated in a form of the consumption pattern 4. The individual housing D according to the consumption pattern 4 may need to secure energy by installing a PV and a fuel cell as a household that consumes power a lot at all times regardless of a time.

(b) Housing Complex

The power management apparatus 101 may set a housing complex for energy independence for each individual housing into consideration of a consumption pattern that is determined for each individual housing based on a power unit. Here, the power management apparatus 101 may build a housing complex that enables an optimal energy operation into consideration of each consumption pattern.

In the individual housing A that is operated in the form of the consumption pattern 1, the power management apparatus 101 may include the individual housing A in a housing complex capable of achieving the energy independence using electricity remaining in the housing complex as necessary electricity, without installing a separate fuel cell. The housing complex that includes the individual housing A may include an individual housing that is operated in the form of the consumption pattern 5 as opposed to the consumption pattern 1. This is to form the energy independence according to different consumption patterns.

In the individual housing B that is operated in the form of the consumption pattern 2, the power management apparatus 101 may include the individual housing B in a housing complex capable of achieving the energy independence using surplus power of an individual housing having a large PV generation amount for insufficient power during the daytime. Here, the power management apparatus 101 may reduce PV facility capacity by grouping the individual housing B and the individual housing C that is operated in the form of the consumption pattern 3 having a large PV generation amount.

Likewise, in the individual housing D that is operated in the form of the consumption pattern 4, the power management apparatus 101 may include the individual housing D in a housing complex capable of achieving the energy independence using surplus power of an individual housing having a large PV generation amount for insufficient electricity during the daytime. Here, the power management apparatus 101 may reduce a PV expansion by grouping the individual housing D and the individual housing C that is operated in the form of the consumption pattern 3 having a large PV generation amount.

Also, the power management apparatus 101 may achieve maximum revenue with minimal new renewable energy equipment by sharing idle ESS devices installed in the individual housing E that is operated in the form of the consumption pattern 5 in a complex.

The power management apparatus 101 may maximize revenue by trading, between neighbors, electricity that is not stored and wasted due to insufficient capacity of ESS through sharing of equipment between complexes and may make more revenue and maintain sustainable energy independence by analyzing incorporation of a new household into a housing complex.

Figure 4:
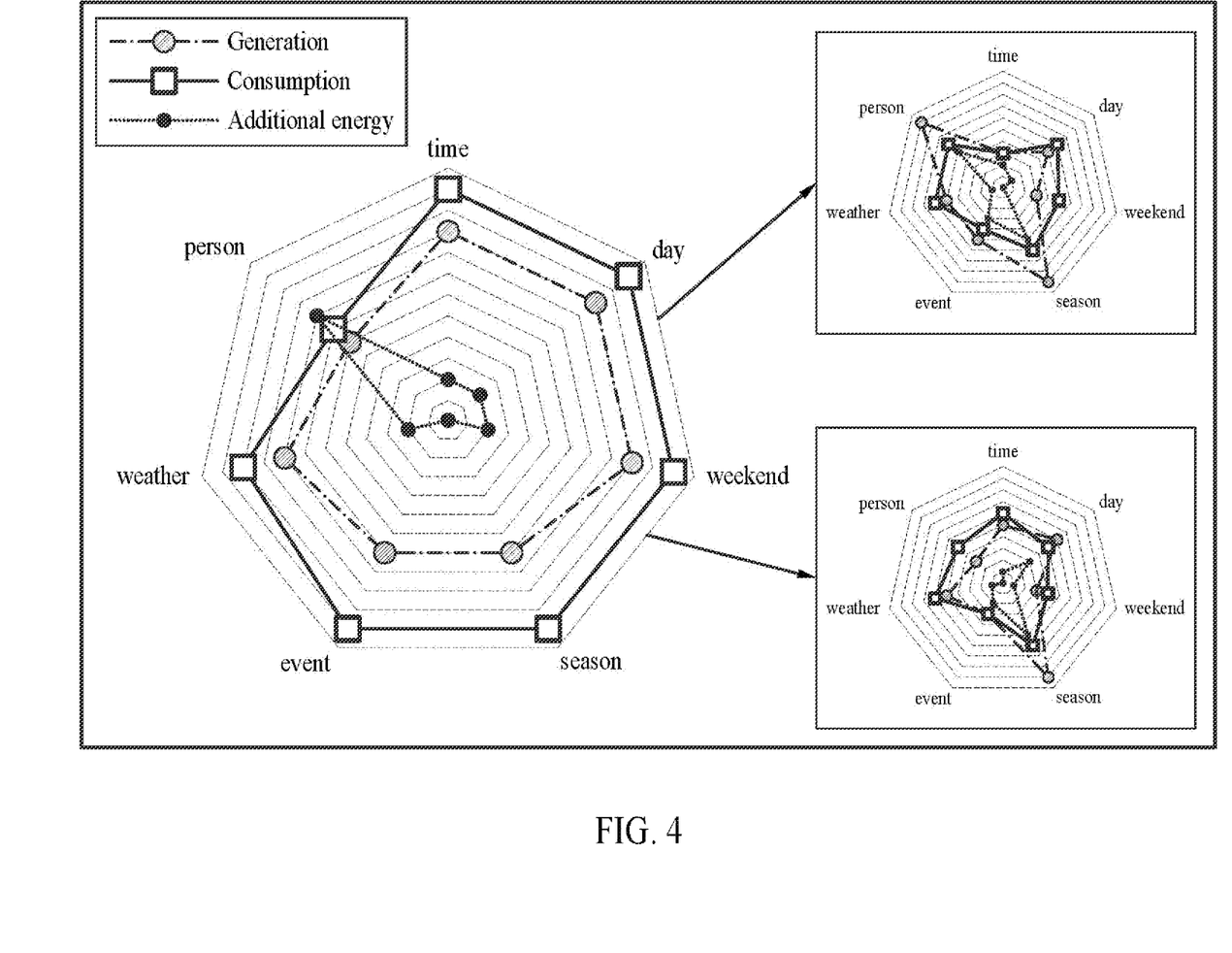
FIG. 4 illustrates an example of describing an influencing factor for building a housing complex according to an example embodiment.

FIG. 4 illustrates an example of describing an influencing factor for building a housing complex according to an example embodiment.

Referring to FIG. 4, the present disclosure may use a feature index for each housing for clustering of a housing complex according to a surplus index. To this end, the present disclosure may define seven influencing factors. In detail, the influencing factor refers to an index, for example, a surplus index, that represents a power surplus amount through analysis for each influencing factor of an individual housing and a housing complex. Also, the influencing factor may be a determination measure that represents a clustering suitability between individual housings or between housing complexes. Here, the following requirements to determine the clustering suitability may be considered:

- ① Digital modeling for designing a housing complex for a surplus index
- ② Profile analysis for each time zone (1 year or more, 4 seasons) of complex power consumption according to an individual housing and a housing complex
- ③ Clustering of generation and consumption matched housings for a housing complex according to a surplus index
- ④ Derivation of a structure for installing and arranging power resources of a housing complex according to a surplus index The influencing factors according to the requirements may include ① a time factor, ② a day factor, ③ a weekday factor, ④ a weather factor, ⑤ an event factor, ⑥ a season factor, and ⑦ a person factor that are related to power generation of the individual housing.

- ① The time factor (by time zone) refers to a time coefficient that may represent a change in a surplus amount based on a unit of 1 hour, which may be an independent time reference.
- ② The time factor (by day) may represent a minimum, a maximum, an average, and a rate of change for 24 hours a day.
- ③ The weekday factor (by weekday) may represent a change of weekday.
- ④ The weather factor (by weather) may represent a change in surplus according to weather (weather information).
- ⑤ The event factor (by event) may represent a change in surplus according to a local event or a social event related to power use.
- ⑥ The season factor (by season) may represent a change in surplus according to seasons.
- ⑦ The person factor may represent a change in a surplus amount according to household member information. Here, the surplus amount may be represented as the following Equation 1 and the surplus index may be represented as the following Equation 2.

$$\text{Surplus amount} = \text{generation amount for each factor} - \text{consumption amount} \quad \text{[Equation 1]}$$

$$\text{Surplus index} = (\text{generation amount} - \text{consumption amount})/\text{generation amount}(\text{total surplus index} = \text{sum for each factor}) \quad \text{[Equation 2]}$$

Therefore, the power management apparatus 101 may derive a surplus index for an individual housing and a housing complex for clustering of housing complexes based on a feature index for each housing. The power management apparatus 101 may derive a degree of matching based on a difference between consumption patterns for matching generation and consumption according to the surplus index. Also, the power management apparatus 101 may analyze combination suitability and reliability with respect to information for each power generation/consumption/surplus index through a feature index for each housing.

Figure 5:
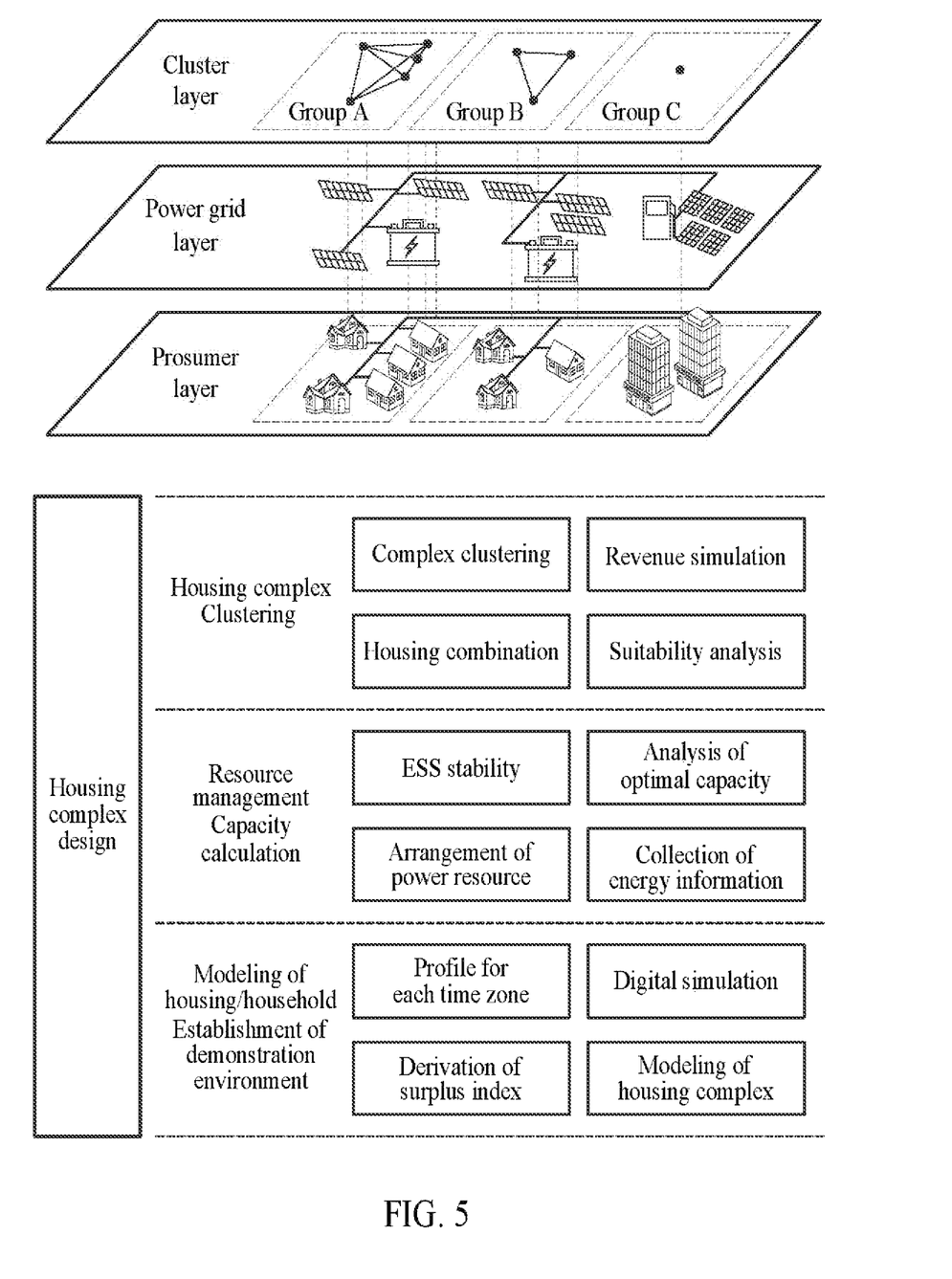
FIG. 5 illustrates an example of describing technology for grouping individual housings based on features of individual housings according to an example embodiment.

FIG. 5 illustrates an example of describing technology for grouping individual housings based on features of individual housings according to an example embodiment.

Referring to FIG. 5, a power management apparatus may generate and maintain a combination of housing complexes for trading surplus power for housing to maximize revenue by trading, between neighbors, electricity that is not stored and wasted due to insufficient capacity of ESS.

The power management apparatus may group individual housings into a housing complex into consideration of a feature of an individual housing surplus index. Here, the present disclosure may group individual housings according to features of the individual housings into a housing complex through classification into a cluster layer, a power grid layer, and a prosumer layer.

The power management apparatus may analyze a power consumption pattern of an energy housing complex that includes a plurality of individual housings and may derive a surplus index derived for each of the individual housings. The power management apparatus may determine an energy housing complex having a largest difference in the power consumption pattern and may supply surplus electricity in the determined energy housing complex to an individual housing that requires electricity among individual housings included in the energy housing complex. The power management apparatus may maintain a housing complex for trading surplus power between individual housings or may combine individual housings into a new housing complex.

The power management apparatus may present a basic housing model of new renewable energy for energy independence and may collect energy information of a housing for trading or sharing power between housings. The power management apparatus may derive a surplus index and may integrate and manage the surplus index through combination of individual housings having different indices based on time-by-time information of the surplus index, thereby reducing waste caused by rash expansion of ESS or fuel cells.

Figure 6:
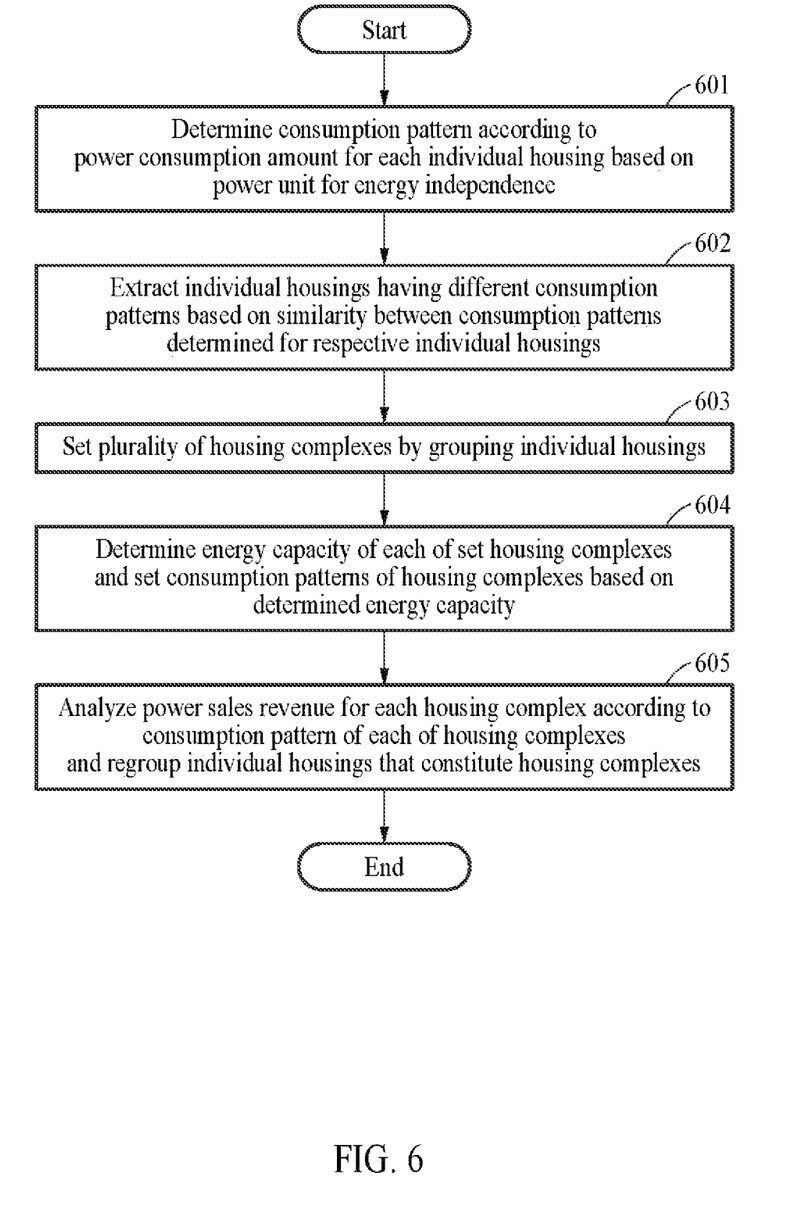
FIG. 6 is a flowchart illustrating an example of a housing complex combination method according to an example embodiment.

FIG. 6 is a flowchart illustrating an example of a housing complex combination method according to an example embodiment.

Referring to FIG. 6, in operation 601, the power management apparatus may determine a consumption pattern according to a power consumption amount for each individual housing based on a power unit for energy independence. To this end, the power management apparatus may determine a power surplus amount based on the power consumption amount for each individual housing. The power management apparatus may determine the power surplus amount based on a power generation amount for each influencing factor that includes at least one of ① a time factor, ② a day factor, ③ a weekday factor, ④ a weather factor, ⑤ an event factor, ⑥ a season factor, and ⑦ a person factor that are related to power generation of the individual housing.

The power management apparatus may determine a consumption pattern of each of the individual housings based on a surplus index of the determined power surplus amount. Here, the surplus index of the power surplus amount may represent a negative value or a positive value for the power surplus amount based on the power generation amount for each influencing factor and the power consumption amount of the individual housing.

In operation 602, the power management apparatus may extract individual housings having different consumption patterns based on a similarity between consumption patterns determined for the respective individual housings. The power management apparatus may extract individual housings having different consumption patterns based on a consumption pattern for each individual housing and a type of energy facility installed for each individual housing. Also, the housing management apparatus may extract individual housings having different consumption patterns based on a difference value between surplus indices of power surplus amounts according to consumption patterns for the respective individual housings.

In operation 603, the power management apparatus may set a plurality of housing complexes by grouping the individual housings. The power management apparatus may group individual housings corresponding to a relatively great difference in the consumption pattern according to the surplus index of the power surplus amount.

Here, that the difference in the consumption pattern is great may represent that a difference between surplus indices of power surplus amounts acquired by subtracting a power consumption amount from a power generation amount generated according to each influencing factor is great. For example, with the assumption that a power surplus amount of the individual housing A is 320 kWh, a power surplus amount of the individual housing B is 171 kWh, and a power surplus amount of the individual housing C is 50 kWh, a surplus index of the individual housing A may be set to 7, a surplus index of the individual housing B may be set to 4, and a surplus index of the individual housing C may be set to 1. Here, a high surplus index may represent that a large amount of power is accumulated since less power is used than generated power. Conversely, a low surplus index may represent that power is insufficient since more power is used than generated power. Therefore, the power management apparatus may extract individual housings having different consumption patterns based on a difference between surplus indices set for the respective individual housings.

Also, extracting individual housings having different consumption patterns may be to complement each other according to a consumption pattern for each individual housing. That is, an individual housing having insufficient power in a housing complex may purchase and use power of an individual housing having a high power surplus amount and an individual housing having a high power surplus amount may sell power to an individual housing having insufficient power, thereby promoting mutual benefits.

Therefore, the power management apparatus may group optimal individual housings capable of maintaining energy independence based on a surplus index of a power surplus amount according to a difference in a consumption pattern.

In operation 604, the power management apparatus may determine energy capacity of each of the set housing complexes and may set consumption patterns of the housing complexes based on the determined energy capacity. The power management apparatus may set consumption patterns of the housing complexes for inducing energy independence based on sharing or non-sharing of resources and presence or absence of power trading between individual housings that constitute each of the set housing complexes.

In operation 605, the power management apparatus may analyze power sales revenue for each housing complex according to a consumption pattern of each of the housing complexes and may regroup individual housings that constitute the housing complexes. The power management apparatus may perform regular combination and analysis on a housing complex for lasting benefits. Here, analysis of sales revenue may lead to proposals for a new housing complex and a use control, which may determine inclusion of a new individual housing and termination of a specific housing.

Also, the power management apparatus may reallocate capacity of new renewable energy resources and recommend expansion to reflect a change in a consumption pattern of a housing complex.

Meanwhile, the methods according to the above-described example embodiments may be generated as a computer-executable program and may be implemented in various record media, such as, for example, magnetic storage media, optical record media, and digital storage media.

Implementations of various techniques described herein may be implemented in digital electronic circuitry, or in computer hardware, firmware, software, or some combinations thereof. The implementations may be implemented as a computer program product, that is, an information carrier, such as, for example, a machine-readable storage device (computer-readable media) or a computer program tangibly embodied in a propagated signal to process operations of a data processing device, for example, a programmable processor, a computer, or a plurality of computers or to control the operations. A computer program, such as, the aforementioned computer program(s), may be recorded in any type of programming languages including compiled or interpreted languages and may be propagated in any type included as another unit suitable for use as a stand-alone program or in a module, a component, a subroutine, or a computing environment. The computer program may be distributed across a plurality of sites to be processed on a single computer or a plurality of computers at a single site and may be interconnected through a communication network.

Examples of processors suitable for processing the computer program include both general-purpose and special-purpose microprocessors and one or more processors of any type of digital computers. In general, a processor may receive instructions and data from read only memory (ROM) or random access memory (RAM) or from both ROM and RAM. Computer components may include at least one processor configured to execute instructions and one or more memory devices configured to store instructions and data. In general, a computer may include one or more mass storage devices, for example, magnetic disks, magneto-optical disks, or optical discs to store data, or may receive data therefrom or transmit data thereto, or may be coupled therewith to be bidirectional. Examples of information carriers suitable for embodying computer program instructions and data include semiconductor memory devices, for example, magnetic media such as hard disks, floppy disks, and magnetic tapes; optical media such as compact disk read only memory (CD-ROM) and digital video disks (DVDs); magneto-optical media such as floptical disks; and hardware devices that are specially configured to store and perform program instructions, such as ROM, RAM, flash memory, erasable programmable ROM (EPROM), electrically erasable programmable ROM (EEPROM), and the like. The processor and memory may be supplemented by special-purpose logic circuitry or may be included therein.

Also, computer-readable media may be any available media accessible by a computer and may include both computer storage media and transmission media.

While this specification includes details of a plurality of specific example embodiments, they should not be construed as limiting to any disclosure or scope of claims, but rather should be understood as description of features that may be peculiar to a specific example embodiment. Specific features described herein in the context of individual example embodiments may be implemented through combination in a single example embodiment. Conversely, various features described in the context of a single example embodiment may also be implemented individually or in any suitable sub-combinations in a plurality of example embodiments. Further, although features may operate through a particular combination and be described as claimed at an initial stage, one or more features from a claimed combination may be excluded from the combination in some cases and the claimed combination may be changed with a sub-combination or modification thereof.

Likewise, although operations are illustrated in specific order, it should not be understood that the operations should be performed in specific order or sequential order or all of the operations should be performed to achieve advantageous results. In a specific case, multitasking and parallel processing may be advantageous. Also, separation of various device components of the example embodiments should not be understood as requiring such separation in all the example embodiments and it should be understood that the aforementioned program components and devices may be integrated into a single software product or packaged into a plurality of software products.

Meanwhile, the example embodiments disclosed with the present specification and drawings are simply provided as a specific example to assist understanding and are not construed as limiting the scope of the disclosure. In addition to the example embodiments disclosed herein, it should be apparent to those skilled in the art to which the disclosure pertains that other modification examples may be implemented without departing from the technical spirit of the disclosure.

What is claimed is:

1. A housing complex combination method comprising:
   determining, by a processor, a consumption pattern according to a power consumption amount for a plurality of individual housings based on a power unit for supplying power to each individual housing;
   extracting, by the processor, from the plurality of individual housings having different consumption patterns based on a similarity between consumption patterns determined for the respective individual housings;
   creating, by the processor, a plurality of housing complexes by grouping the extracted individual housings having different consumption patterns;
   determining, by the processor, an available energy capacity for each of the set housing complexes and setting consumption patterns of the housing complexes based on the available energy capacity of each housing complex; and
   analyzing, by the processor, power surplus amounts for each housing complex according to a consumption pattern of each of the housing complexes and regrouping individual housings that constitute the housing complexes so as to improve the efficiency of the power consumed by each housing complex.

2. The housing complex combination method of claim 1, wherein the determining of the consumption pattern comprises:
   determining, by the processor, a power surplus amount based on the power consumption amount for each individual housing; and
   determining, by the processor, a consumption pattern of each of the individual housings based on a surplus index of the determined power surplus amount.

3. The housing complex combination method of claim 2, wherein the determining of the power surplus amount comprises determining the power surplus amount based on a power generation amount for each influencing factor that comprises at least one of a time factor, a day factor, a weekday factor, a weather factor, an event factor, a season factor, and a person factor that are related to power generation of the individual housing.

4. The housing complex combination method of claim 3, wherein the surplus index of the power surplus amount represents a negative value or a positive value for the power surplus amount based on the power generation amount for each influencing factor and the power consumption amount of the individual housing.

5. The housing complex combination method of claim 1, wherein the extracting of the individual housings comprises extracting individual housings having different consumption patterns based on a consumption pattern for each individual housing and a type of energy facility installed for each individual housing.

6. The housing complex combination method of claim 2, wherein the extracting of the individual housings to form the plurality of housing complexes comprises extracting individual housings having different consumption patterns based on a difference value between surplus indices of power surplus amounts according to consumption patterns for the respective individual housings.

7. A housing complex combination method comprising:
   determining, by a processor, a power surplus amount according to a power consumption amount for each individual housing based on a power unit that supplies power to each individual housing;
   calculating determining, by the processor, a consumption pattern of each of individual housings based on a surplus index of the determined power surplus amount and extracting individual housings having different consumption patterns;
   grouping, by the processor, the extracted individual housings having the different consumption patterns to create a plurality if different housing complexes;
   determining, by the processor, an available energy capacity of each of the grouped housing complexes and setting consumption patterns of the housing complexes based on the available energy capacity of each housing complex, and
   analyzing, by the processor, power surplus amounts for each housing complex according to a consumption pattern of each of the housing complexes and regrouping individual housings that constitute the housing complexes so as to improve the efficiency of the power consumed by each housing complex.

8. The housing complex combination method of claim 7, wherein the extracting of the individual housings comprises determining the power consumption pattern of the individual housing using a surplus index of a power surplus amount that represents a negative value or a positive value for the power surplus amount which is calculated based on a power generation amount for each influencing factor related to power generation of the individual housing and a power consumption amount of the individual housing.

9. The housing complex combination method of claim 7, wherein the extracting of the individual housings comprises extracting individual housings having different consumption patterns based on a consumption pattern for each individual housing and a type of power unit installed for each individual housing.

10. A power management apparatus comprising:
a processor,
wherein the processor is configured to
determining a consumption pattern according to a power consumption amount for a plurality of individual housings based on a power unit for supplying power to each individual housing;
extracting from the plurality of individual housings having different consumption patterns based on a similarity between consumption patterns determined for the respective individual housings;
creating a plurality of housing complexes by grouping the extracted individual housings having different consumption patterns;
determining an available energy capacity for each of the set housing complexes and setting consumption patterns of the housing complexes based on the available energy capacity of each housing complex; and
analyzing power surplus amounts for each housing complex according to a consumption pattern of each of the housing complexes and regrouping individual housings that constitute the housing complexes so as to improve the efficiency of the power consumed by each housing complex.

11. The power management apparatus of claim 10, wherein the processor is configured to
determine a power surplus amount based on the power consumption amount for each individual housing, and
determine a consumption pattern of each of the individual housings based on a surplus index of the determined power surplus amount.

12. The power management apparatus of claim 10, wherein the processor is configured to extract individual housings having different consumption patterns based on a consumption pattern for each individual housing and a type of power unit installed for each individual housing.

* * * * *